Patented June 13, 1939

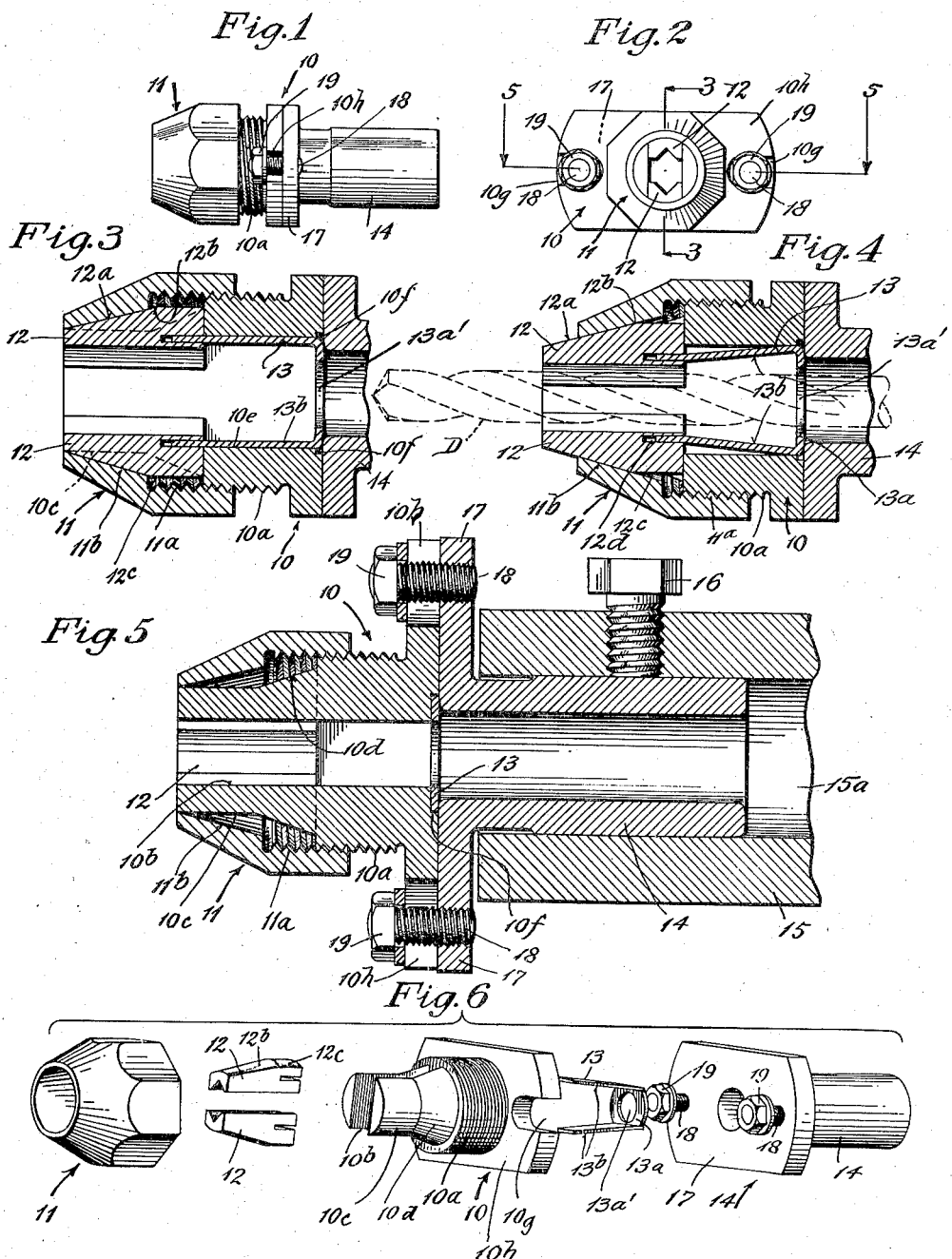

2,162,246

UNITED STATES PATENT OFFICE 2,162,246

ADJUSTABLE DRILL CHUCK

George H. Cote, Bridgeport, Conn.

Application October 17, 1936, Serial No. 106,082

2 Claims. (Cl. 279—69)

This invention relates to drill-chucks, and, more particularly, aims to provide an adjustable drill-chuck which is practicable for use on the turret of an automatic or other screw machine.

In the latter regard, although that represents but one aspect of the invention, since the new chuck will be valuable in other relations than for use on the turret of a screw machine, a special object of the invention is to provide a novel and valuable chuck, characterized by a combination of parts so proportioned and arranged that a chuck is provided which is of the so-called expanding, or adjustable, type, and hence capable of taking drills and other tools of differing diameter, and yet a chuck wherein neither diminution of axial length is sacrificed to attain reduction of diametral dimension, or vice versa, that is, a chuck which is at once very short, and at the same time of extremely small outside diameter at even its point of greatest thickness, so that it may be used in a screw machine without interference with tools at the front and back sides of the work.

Another object is to provide a chuck as just described, which, while of very small diameter at its rear part, can nevertheless be gradually forwardly reduced in diameter so as to taper considerably toward the front end of the chuck from which the operative end of the tool protrudes.

A particular object of the invention is satisfactorily to solve a problem of importance in the screw machine art; which, as already indicated, is the provision of an adjustable drill-chuck capable of practicable use on the turret of an automatic or other screw machine. In these machines, as is well known, the turret, whether a horizontal one turning on a vertical axis as is customary in automatic screw machines, or a vertical one turning on a horizontal axis, is provided with a number of tool-carrying stations which become operative seriatim and which are arranged circumferentially of the turret. Each tool must be so mounted as to become properly operative after a fractional rotation of the turret to bring that tool into active position opposite the spindle which carries the work. These tools, and particularly drills, in which latter term are included reamers, taps, countersinks and other instrumentalities for recessing the work or acting on the surfaces of recesses therein, are of different diameters, at their shanks as well as at their operative ends; and the substitution of one such tool for another, or the same kind of tool for another of a larger or smaller diameter, at a drill-carrying station on the turret, has heretofore been a laborious and time-consuming operation.

In making the present invention, certain limitations had to be considered and certain difficulties overcome. In a screw machine the turret and the work spindle are so placed for coactive operation, and the tool-holding stations of the turret are generally so disposed one with relation to another, that there is very little if any room, particularly in some classes of work, between the turret and the work on the spindle for an auxiliary mounting for the tool when said mounting projects considerably beyond the turret. At the same time, particularly in some classes of work, the drill or other tool, even though its length is considerably in excess of the length of the mounting, cannot project considerably beyond the outer end thereof. Furthermore, an auxiliary mounting must be of very small diameter, and very often, in view of the operation appointed for the tool, should be distinctly tapered toward the point of protrusion of the tool therefrom. This is so because other tools and their mountings frequently are brought against the work from the sides and interference between these tools and the drill-chuck must be avoided so that the side tools and end tool in the chuck may be caused to work at the same time. In spite of the restrictions on the size of the chuck, the tool must be tightly gripped in the turret by a dependably rugged mounting structure.

According to the present invention, there is provided an adjustable drill-chuck, which is very short, and at the same time one of such extremely small diameter and so reduced in diameter at its forward end as to be capable of use in properly mounting practically any recessing or recess-shaping of finishing tool at any selected station on any standard or special turret of screw machines.

Nevertheless, the invention provides a drill-chuck which is of surprising shortness, and also of extremely small diameter, and at the same time an adjustable drill-chuck which is economical to manufacture, of strong and dependable structure, of comparatively wide range of adjustment, easily and quickly opened and closed yet of high degree of security of grip on the tool; yet a drill-chuck which incorporates means for permitting adjustment of the chuck in another way, and relative to the turret station at which the chuck is placed, this means permitting adjustment of the chuck itself relative to the turret station at which it is to be secured, as contradistinguished from that adjustability of the jaws of the chuck which makes the latter an adjustable chuck.

The importance of adjustability at the turret of a screw machine of the new chuck of the present invention will be appreciated when a fact well known in the screw machine art is recalled, which is that in time, from wear and jar, the axis of the socket or the like for facilitating tool mounting at each station of the turret inevitably becomes displaced more or less from its original concentricity with the axis of the work-carrying spindle.

Other features and advantages will hereinafter appear.

In the accompanying drawing, which illustrates a now preferred embodiment of drill-chuck, according to my invention,—

Figure 1 is a side elevation of said embodiment.

Fig. 2 is a front elevation thereof.

Fig. 3 is an axial section taken on the line 3—3 of Fig. 2, but on an enlarged scale.

Fig. 4 is a view similar to Fig. 3, but showing the cap screwed up on the head of the chuck to cause the jaws to grip a drill shown in broken lines.

Fig. 5 is an axial section taken on the line 5—5 of Fig. 2, and showing the chuck parts as in Fig. 3, and also showing an axial section of a turret station and one satisfactory way of securing at said station a carrier element of the chuck.

Fig. 6 is an exploded perspective view showing the different parts participating in the make-up of the chuck of the present invention as shown in Figs. 1 to 5.

The drill-chuck of the present invention, in the exemplifying form thereof shown in the drawing, includes a fixed hollow core or head 10, and an adjusting sleeve or cap 11.

To directly mount the sleeve 11 on the head for axial adjustment thereon, there are provided an external thread 10a on the rear part of the head and an internal thread 11a in the rear part of the sleeve.

In order that such direct threaded connection between the head 10 and the cap 11 can be taken advantage of to reduce the maximum diameter of the chuck at any point along its length substantially to no more than the sum of the diameter of the largest size tool to be gripped in the chuck, plus twice the thickness of the externally threaded part of the head, and twice the thickness of the internally threaded part of the head, the jaws for gripping the tool as shown are located nowhere overlappingly of the threaded part of the head.

These jaws, in the present case two in number, with one diametrically opposite the other, are indicated at 12. Such jaws are housed and guided in a longitudinal slotting 10b across the forward part of the head; such slotting as shown being wholly forward of the rear part of the head carrying the external thread. Each jaw as shown is of precisely the same length as the length of the head from the forward end thereof back to the rear limit of the slotting 10b; and there is no necessity of having the forward ends of the jaws protrude beyond the forward end of the head 10.

With these arrangements, the length of the chuck is able to be limited, beyond the forward end of the external thread on the head 10, merely to the length of that part of the internal thread of the cap 11 which projects beyond the front end of the head when the jaws are at maximum separation, or merely to the length of the jaws 12. The presence of these jaws, it will be noted, does not add to any extent to the length of the chuck in any adjustment thereof.

The cap 11, and the part thereof forward of its internal thread, is provided with an interior camming surface 11b here shown as conical. Each jaw 12 has its cap-facing surface 12a, back to a point 12b, rearwardly outwardly flared in coincidence with the conicity of the camming surface 11b. In rear of said point 12b, the cap-facing surface of each jaw, as shown at 12c, is so extended as to clear the internal thread of the cap at all times; these surfaces 12c as here shown being segments of a cylinder concentric with the axis of the chuck.

Further, as shown, the forward portion 10c of the head,—from the front end of the head back along the same a distance substantially equal to the length of the thread-carrying part of the cap 11,—is cylindrical; such cylindrical forward portion of the head being of the same diameter as the forward end of the camming surface 11b.

As a result of this arrangement, the jaws 12 can be adequately housed and guided in the slotting 10b at all times, and yet the cap 11 may be screwed on the head 10 freely and easily in one direction or the other, to move the jaws from their maximum separation as shown in Fig. 5 to their minimum separation as shown in Fig. 4, and vice versa.

In order to give the jaws 12 a very large degree of housing and guidance in the slotting 10b, at the rear ends of the jaws particularly, the head 10 includes, between the rear portion thereof carrying its external thread, and the forward cylindrical portion 10c thereof, an intermediate portion 10d, which flares rearwardly all along its length back to the rear end of slotting 10b. The rear or larger diametered end of the intermediate portion 10d, however, is of a diameter sufficiently less than that of the threaded rear portion of the head 10, to avoid any interference with the internal thread of the cap 11.

The rear ends of these jaws 12 are housed and guided in the slotting 10b where the latter passes through the rearwardly flaring intermediate portion 10d of the head 10, which portion 10d carries the end of the slotting of greatest dimension radially of the chuck; while the rear ends of the jaws are the parts thereof which also are of greatest dimension radially of the chuck.

Referring now to the mounting for the jaws 12, this mounting as here shown is such that each jaw is bodily rather than pivotally moved when the cap 11 is screwed up on the head 10, and such that, at the same time, the jaws are always resiliently urged toward maximum separation. According to this feature, the jaws 12 during movement remain parallel to the axis of the chuck. Furthermore, there are only two jaws, always brought together in exact parallelism, thereby to insure proper location of the drill at the axis of the chuck and a very tight grip on a round drill.

Such mounting includes a resilient means wholly in the head 10.

Thus the means for mounting the jaws and for yieldingly urging these jaws to maximum opening yet for permitting them to be always forced to full tightness of grip on the tool, fails in any way to add to the length of the chuck; just as the association of the jaws with the cap and the head as hereinabove described fails in any way to add to the length of the chuck.

Said resilient mounting means, as here shown, is in the form of a U-spring 13 which is stamped or otherwise formed from suitable sheet material, as spring steel or other proper metal, and so as to have a flat U-bowl or intermediate stretch 13a joining a pair of forwardly extending legs 13b. This intermediate part 13a of the spring is of a length about equal to the longer cross-sectional dimension of an elongate recess 10e in the threaded part of the head 10, and is of a width sufficient to allow said stretch to carry an aperture 13a' large enough to pass therethrough a tool of the largest size diameter to be used in the chuck. The recess 10e aligns with and at its forward end merges into the rear end of the slotting 10b. The legs 13b of the U-spring are shown as of the same width as the shorter cross-sectional dimension of the recess 10e, so that the opposite side edges of these legs are snugly received in the recess 10e. The forward ends of the legs 13a are driven into and held by force-fit in transverse slots 12d across the rear ends of the jaws 12. When the jaws are thus assembled on the U-spring 13, the latter becomes, as seen best in Fig. 3, wholly contained inside the head 10; with the intermediate stretch 13b of this spring extending perpendicularly across the inner end of the head and seated in a circular recess 10f (compare Figs. 3 and 5) at that end of the head.

With the jaws 12 at maximum separation, that is, with the cap 11 unscrewed to the fullest extent intended on the head 10 as shown in Figs. 3 and 5, the spring legs 13b lie flat against the smaller walls of the recess 10e. When, however, the jaws are moved toward minimum separation, as the result of screwing up the cap on the head, the free lengths of these legs are sprung in as shown in Fig. 4, but, as will be seen from this view, with the tool-gripping faces of the two jaws 12 always parallel with each other and with the axis of the chuck.

The jaws 12 always move bodily instead of pivotally.

Any pivotal movement of a jaw 12 such as would swing its outer end toward the chuck axis is prevented, because the conicity of the camming surface 11b in the cap coincides as shown with the conicity of the cap-facing surfaces 12b of the jaws, and the rear ends of the jaws are straight and perpendicular to the chuck axis, and consequently these jaw ends, from their tops to their bottoms, are always urged, regardless of any springing in of the spring legs 13b from parallelism, to remain in contact with while moving relative to the inner end portions of the slotting 10b, which end portions are likewise straight and perpendicular to the chuck axis.

At the same time, any pivotal movement of a jaw 12 such as would swing the center line of its tool-engaging face at an angle to the chuck axis is prevented, due to the fact that the side walls of the slotting 10b of the head 10 cannot, despite the fact that such slotting is open at the front end of the head, spring apart. The means for preventing this comprises the cylindrical nose 10c, and the forward end of the cap 11, where the internal diameter of the cap is the same as that of the nose 10c.

The tool, here a drill D indicated by broken lines in Fig. 4, is shown as being clamped centrally of the chuck by the jaws 12, following tightening of the cap 11 on the head 10. It will be noted that not only the shank but the fluted or working length of this drill can when desired be extended beyond the rear end of the head, due to the aperture 13b in the U-spring 13.

Also, as is clear from the drawing, the tool can be set in the chuck so that the protrusion of the working end of the former beyond the forward end of the chuck can be as slight as may ever be required.

Furthermore, with the cap 11 interiorly conformed as already described to include the camming surface 11b immediately in advance of the cap's internal thread 11a, and with this camming surface at its rear end of largest diameter stepped down as shown from said thread, it is possible to give a comparatively sharp taper, as illustrated, to the exterior of the head, from a point somewhat in rear of the front end of the thread 12b, to the front end of the cap, thereby making it possible to send the tool to the intended depth relative to the work on the spindle where otherwise a chuck of ordinary diameter at and near its front end would prevent.

In order to allow for mounting the chuck at a desired station on the turret of a screw machine, and yet to permit subsequent adjustment of the chuck relative to said station whenever required to overcome an eccentricity developing between the chuck and the axis of the work spindle, the chuck as shown includes a carrier 14 here illustrated in the form of a cylindrical shank of a diameter to fit within the cylindrical socket 15a usually locating a tool station on the turret 15 of the screw machine. The shank is hollow so that the tool D can be gripped in the chuck with the rear end of the tool to the rear of the chuck to any extent desired.

This carrier 14, adapted to be securely clamped in place in the socket 15a, as by a set screw 16 like the one usually provided at such socket for clamping the ordinary tool carrier in place therein, is shown as also including a transverse plate 17 at its forward end. This plate is desirable elongated as illustrated, thereby to provide a pair of diametrically opposite lateral enlargements of the shank each of which is bored and tapped for the tight mounting therein of a threaded stud 18. The projecting portions of these studs, as the parts are here shown, pass through slots 10g cut in from the opposite ends of lateral enlargements on the rear end of the head 10 and corresponding to and matching the lateral enlargements on the front end of the carrier 14. These lateral enlargements of the head 10 which carry the slots 10g are here the opposite end portions of a transverse elongate plate 10h on the rear end of the head 10.

As shown the chuck is rigidly clamped on the carrier 14 by applying nuts 19, with interposed washers as illustrated, to the ends of studs 18 beyond the slots 10g. These slots in each of two perpendicular directions are of greater dimension than the diameter of the studs, and thus, on very slightly loosening the nuts 19, the plate 10h can be shifted relative to the plate 14a, universally, and to an extent required to take up any discovered eccentricity between the axis of the chuck and the axis of the spindle, following securement of the carrier on the turret; whereupon the nuts can again be fully tightened to lock the chuck in concentric relation to the spindle.

It will be seen that an adjustable drill-chuck, and one particularly adapted for practicable use on screw machines, has been provided, and one well calculated to attain and secure the various stated objects and advantages of the invention.

These results are obtained, in the exemplifying construction shown, because a drill has been disclosed herein which can be characterized by a plurality at least of the following structural features,—all of which will again be mentioned briefly, since all of them would be incorporated in an embodiment of the invention as now preferred,—to wit, readily adjustable gripping jaws 12, preferably merely two thereof, with one diametrically opposite the other; a mount for the jaws such that they will be moved bodily instead of pivotally during tool-seizing adjustments; direct interposition of these jaws between an outermost jaw-tightening sleeve or cap 11, and the tool D; a fixed innermost core 10 or head having an external thread 10a and forward of which thread each jaw is entirely located; a directly threaded interconnection between the core or head and the jaw-tightening cap, such interconnection being provided by said external thread 10a on the head and an internal thread 11a in the rear portion of the cap; a substantially conical camming surface 11b in the forward portion of the cap and which forwardly gradually reduces in diameter; an exterior conformation of the forward part of the cap 11 such that at its exterior this cap also forwardly gradually reduces in diameter; the making of the part of the cap 11 which carries this camming surface of about the same length as the part of the head 10 carrying the external thread 10a; an exteriorly cylindrical portion 10c on the head, beyond its external thread and at the forward end of the head; the making of this cylindrical portion 10c also of the same diameter as the internal diameter of the forward end of the cap 11, and of about the same length as the part of the head carrying the external thread 10a; the making of the jaws 12 of a length about equal to the length of the head 10 forward of its external thread 10a; a diametral slotting 10b of the head from the front end thereof back to the forward end of the part of the head carrying the external thread 10a, such slotting to take the jaws 12; a flat wall in a plane perpendicular to the axis of the head 10 at the inner end of the slotting 10b, and, for nonrockable engagement with the wall last-mentioned, a flat wall at the inner end of each jaw 12 perpendicular to the line of tool grip along the jaw; a shaping of the outwardly lying or cap-facing longitudinal surfaces of the jaws 12 such that from the outer ends of the jaws these surfaces are outwardly rearwardly flared but not beyond a point where these flared surfaces would interfere with the internal thread 11a of the cap 11; the inclusion of a resilient means 13, located entirely in the head 10, for urging the jaws 12 always toward maximum separation; and a constitution of this resilient means such that the same will permit a rear portion of the tool D being gripped by the jaws to be extended if desired rearwardly of said means and of the rear end of the chuck. Said resilient means is preferably a band leaf-spring bent into a U-shape, with the free ends of the legs 13b of the U forwardly extended and inserted into the rear ends of the jaws 12. Desirably, this spring is housed in a recess 10f of elongate cross-section in the rear portion of the head 10; the forward end of said recess is aligned and communicates with the rear end of the diametral slotting 10b in the forward portion of the head; and the bowl of the U established by the leaf-spring is apertured as at 13b to provide a passageway for the tool D and to permit protrusion of the rear end of the tool beyond the rear end of the chuck.

Variations and modifications may be made within the scope of this invention and portions of the improvements may be used without others.

I claim:

1. In an adjustable drill chuck comprising a head having a reduced portion and provided with a slot extending to the free end of the head with the walls of the slot being parallel to the axis of the head, a pair of opposed jaws slidably mounted in the slots, each having faces shaped to snugly engage the side and end walls of the slot and a camming surface at the end thereof, and a cap threaded on the head to surround the jaws and provided with camming surfaces cooperable with the camming surfaces of the jaw to move them radially of the head, the head being provided with a rounded portion adjacent its free end and having a diameter corresponding to the internal diameter of the cap whereby the slotted end of the head is prevented from spreading; means for interconnecting the jaws and maintaining the camming surfaces on the jaws and cap in engagement with one another, said means comprising resilient element engaging each of the jaws and extending for substantially the full width of the jaws, the transverse interconnecting portion of said interconnecting element being provided with an aperture of a size to receive the shank of the drill of the largest diameter to be used with the chuck, said aperture enabling drills having shanks longer than the chuck to be properly inserted and held by the jaws.

2. In an adjustable drill chuck comprising a head having a reduced portion, said head having a large recess and a slot extending therefrom to the free end of the head, the walls of the slot being parallel to the axis of the head, a pair of opposed jaws slidably mounted in the slots, each of said jaws having faces shaped to snugly engage the side and end walls of the slot and a camming surface at the outer end thereof, a cap threaded on the head to surround the jaws and having camming surfaces cooperable with the camming surfaces on the jaws to move them radially of the head, said jaws being provided with slots at their rear end; means to join together said jaws comprising a U-shaped element of flat spring material substantially the width of the jaws having the bow thereof mounted in the recess provided in the head, the bow having an aperture of sufficient size to receive the shank of the largest diameter of tool and the legs extending into the slots in the jaws for normally holding the jaws in expanded position, said aperture permitting the passage of the shanks of tools of lengths greater than the length of the chuck whereby tools having long shanks can be readily and properly positioned in the chuck.

GEORGE H. COTE.